United States Patent [19]

Hartwimmer et al.

[11] 4,262,101

[45] Apr. 14, 1981

[54] COPOLYMERS OF TETRAFLUOROETHYLENE AND PROCESS FOR THEIR MANUFACTURE

[75] Inventors: Robert Hartwimmer; Jürgen Kuhls, both of Burghausen, Fed. Rep. of Germany

[73] Assignee: Hoechst Aktiengesellschaft, Fed. Rep. of Germany

[21] Appl. No.: 97,685

[22] Filed: Nov. 27, 1979

Related U.S. Application Data

[63] Continuation of Ser. No. 913,042, Jun. 6, 1978, abandoned, which is a continuation-in-part of Ser. No. 828,330, Aug. 29, 1977, abandoned.

[30] Foreign Application Priority Data

Aug. 31, 1976 [DE] Fed. Rep. of Germany ....... 2639109

[51] Int. Cl.³ .......................................... C08F 214/26
[52] U.S. Cl. ..................................... 526/89; 526/206; 526/247
[58] Field of Search ........................ 526/89, 206, 247

[56] References Cited

U.S. PATENT DOCUMENTS

| | | | |
|---|---|---|---|
| 2,975,163 | 3/1961 | Lo | 526/247 |
| 4,029,868 | 6/1977 | Carlson | 526/247 |

*Primary Examiner*—Harry Wong, Jr.
*Attorney, Agent, or Firm*—Connolly and Hutz

[57] ABSTRACT

The invention relates to a process for the copolymerization of tetrafluoroethylene with perfluorinated alkylvinyl ethers of the formula $$CF_3-(CF_2)_n-O-CF=CF_2$$

wherein n is 1 to 3, in the presence of hexafluoropropene, and the thermoplastic terpolymers so obtained. The copolymerization may be carried out according to the suspension process or the emulsion process in liquid phase in the presence of liquid chain transfer agents. In the presence of hexafluoropropene, the amount of perfluoro(alkyl vinyl) ethers incorporated in the copolymer is considerably increased. The terpolymers in accordance with this invention are distinguished by a number of interesting properties, and are useful for melt processing to shaped articles and as coating materials.

5 Claims, No Drawings

COPOLYMERS OF TETRAFLUOROETHYLENE AND PROCESS FOR THEIR MANUFACTURE

This application is a continuation of application Ser. No. 913,042 filed June 6, 1978 now abandoned which is a continuation-in-part of application Ser. No. 828,330 filed Aug. 29, 1977 now abandoned.

The invention relates to copolymers consisting of tetrafluoroethylene, perfluoro(alkyl vinyl) ethers and hexafluoropropene and to a process for their manufacture.

As a result of its special, and in comparison with other plastics extraordinary, properties, polytetrafluoroethylene, which has been known for over 30 years, has been able to win a special position in the plastics market. These properties, such as high thermal stability, high melting point, resistance to all customary chemicals, low coefficient of friction, extreme anti-adhesion properties and also excellent mechanical and electrical properties make polytetrafluoroethylene a construction material which is today indispensible and for which in many fields of application there is no substitute.

There are, however, certain disadvantages connected with the processing methods which result in particular from the extremely high melt viscosity. Polytetrafluoroethylene must essentially be treated by processing techniques known from the powder metallurgy field.

There have therefore been numerous attempts to produce polymers that on the one hand have as many as possible of the extraordinary properties of polytetrafluoroethylene but on the other hand are less difficult and less expensive to process. Meeting the requirement of obtaining a copolymer having as many as possible of the valuable properties of the homopolymer tetrafluoroethylene depends decisively upon the selection of the comonomer or comonomers.

Perfluorinated or at least partially fluorinated comonomers meet this requirement best. It is thus possible to produce copolymers that are on the one hand plastics that are similar to polytetrafluoroethylene and on the other hand can be processed like normal thermoplasts by conventional methods, that is to say on extruders, blown film machines and injection molding machines, on calenders, and in accordance with other current techniques. The most well known copolymers of this type, which have become very important industrially and on account of their favourable properties have obtained an important position in the market, are the copolymers of tetrafluoroethylene (abbreviated to TFE hereinafter) and hexafluoropropene (HFP hereinafter) as well as, recently, copolymers of TFE and fluorinated alkyl vinyl ethers and of these especially those with perfluorinated alkyl vinyl ethers (PAVE hereinafter). From a particular HFP or PAVE content these copolymers are true thermoplasts. Their resistance to chemicals is equal to that of polytetrafluoroethylene. The same applies, with certain limitations, as regards the mechanical and electrical properties. The chief differences are the melting point and the maximum continuous use temperature (no load). The melting point of these copolymers is in the case of TFE/HFP copolymers approximately 50° to 80° C. and in the case of TFE/PAVE copolymers approximately 20° to 25° C. below that of polytetrafluoroethylene at a molecular weight adjustment correct for the processing. The maximum continuous use temperature in the case of the former copolymer is reduced by 50° to 60° C., and in the case of the latter only by approximately 10° C. In addition, the latter also have a better tensile strength and dimensional stability under heat and a slightly higher hardness.

The production and the properties of TFE/HFP copolymers are described in particular in U.S. Pat. No. 2,549,935; 2,598,283; 2,946,763; 2,952,669, 3,062,793 and 3,132,124. The following state of the art is apparent from these specifications: copolymers of TFE and HFP can be produced from appropriate comonomer mixtures by radical-controlled copolymerization, wherein to obtain suitable processing properties the content of HFP comonomer in the comonomer mixture must be at least 25% by weight (U.S. Pat. No. 2,549,935), and preferably 30 to 90% by weight (U.S. Pat. Nos. 2,598,283 and 2,946,763) or even higher (U.S. Pat. No. 3,062,793). The polymerization can be carried out in an aqueous medium (U.S. Pat. Nos. 2,549,935; 2,946,763 and 3,132,124), in a non-aqueous medium (U.S. Pat. Nos. 2,952,669 and 3,062,793), in an aqueous phase with emulsified perfluorocarbon solvent therein (U.S. Pat. No. 2,952,669), at high (U.S. Pat. No. 3,062,793) as well as at low temperatures (U.S. Pat. No. 2,598,283). The rather high process pressures of 50 to several thousand atmospheres gauge and reaction temperatures of 50° to 350° C. can be reduced by using special catalysts and an organic polymerization phase (U.S. Pat. No. 2,952,669). The selective production of suspension and emulsion polymers is possible. The higher the amount of HFP incorporated in such a copolymer, the greater is the amorphous portion in the polymer, and the lower the amount of HFP the higher is the degree of crystallinity. TFE/HFP copolymers that meet the exacting requirements as regards processing properties and properties in use must have an HFP content of between 7 and 27% by weight, as normally determined by the net absorption ratio of the two IR bands at 983 $cm^{-1}$ and 2353 $cm^{-1}$ (corresponding to values of this absorption ratio of 1.5 to 6). TFE/HFP copolymers with an HFP content of less than 7% by weight (IR net absorption ratio <1.5) are too crystalline, too fragile and too brittle and are, therefore, not capable either of being processed or used. Products having an HFP content of more than 27% by weight (IR net absorption ratio >6) have relatively good mechanical properties but the melting point lies in a very low range of a little over 200° C. down to approximately 150° C. Also the ease with which they swell or dissolve in organic solvent is much increased. Such products are therefore only of secondary importance.

The thermal properties of the TFE/HFP copolymers, which leave much to be desired especially in comparison with polytetrafluoroethylene, gave rise to the requirement for improved fluorothermoplasts. Copolymers of TFE with alkylperfluorovinyl ethers and perfluoroalkylperfluorovinyl ethers were first described in U.S. Pat. Nos. 3,159,609 and 3,132,123. The copolymerization can be carried out either in an inert perfluorinated solvent or in aqueous phase under the conditions for emulsion polymerization. The copolymers thus produced have a number of disadvantages, however, especially a highly fluctuating molecular weight which is difficult to control with consequent markedly varying melt viscosities. Unstable end groups are responsible for the occurence of bubbles in molded articles produced therefrom and these bubbles considerably impair the mechanical strength. A very wide molecular weight distribution is the reason for the marked and unacceptable swelling of the extruded or injection-molded articles, making it almost impossible to produce molded articles that are dimensionally accurate. Furthermore, molded articles of this type may shrink excessively if exposed to elevated temperatures.

To overcome these disadvantages special steps were taken during the polymerization process. Specifically, polymerization was carried out in an organic reaction medium consisting of fluorochloroalkanes or fluorochlorohydroalkanes, and special low temperature initiators, especially fluorinated acyl peroxides, were used. Such a process is described in U.S. Pat. No. 3,528,954. The afore-mentioned process may furthermore be combined with the use of hydrogen-containing chain-transfer agents, especially methanol, as described in U.S. Pat. No. 3,642,742. Especially with the latter process it was possible to repress considerably the unstable end groups and the tendency to swell in such copolymers of fluorinated alkylvinyl ethers and TFE produced in a purely organic polymerization medium and to establish a relatively narrowly confined melt viscosity.

To achieve a similar improvement of the product by polymerization in aqueous phase is significantly more difficult. Since in this case the regulating action, which an organic reaction medium always exerts to a certain extent, is lacking, products of too high a molecular weight are usually produced in aqueous phases and these are poorly suited to thermoplastic processing. Conventional hydrogen-containing chain transfer agents such as those described in U.S. Pat. No. 3,642,742, although capable of influencing the molecular weight to bring the melt viscosity of the copolymer to the desired level suitable for processing, cannot bring about the desired restriction of the excessively wide molecular weight distribution in the aqueous system, which is of considerable importance for processing the products. A possible help here is the use of gaseous hydrogen-containing chain transfer agents instead of the liquid chain transfer agents, as described in U.S. Pat. No. 3,635,926. Chain transfer agents of this type are especially hydrogen and lower hydrocarbons such as methane or ethane.

However, copolymerization in the aqueous phase is preferred to one carried out in a purely organic solvent since this enables the awkward and expensive recovery of four to ten times the amount of special and expensive highly fluorinated solvents calculated in the copolymer, to be dispensed with. Also the copolymer dispersions that can be produced only in aqueous medium are highly desirable for many industrial purposes such as, for example, for coatings, impregnation, dip coatings, composite adhesion and the like. However, the method of aqueous-phase copolymerization using gaseous chain transfer agents described in U.S. Pat. No. 3,635,926 does not provide an industrially favourable solution since the advantage of being able to polymerize in aqueous phase is limited as a result of the fact that the recirculation and reseparation of the comonomers used in excess is rendered difficult by the presence of gaseous chain transfer agents. Furthermore it is stated therein that the polymerization rate is reduced by the gaseous chain transfer agents used so that it is extremely desirable, in order to increase it, to add a certain amount of a fluoroalkane or fluorochloroalkane solvent to the aqueous phase.

It is an object of this invention, therefore, to provide an aqueous-phase process for the production of a thermoplastic fluorocopolymer, which renders possible a rational and economic use of the valuable comonomers. Another object of this invention is to provide a thermoplastic fluorocopolymer with properties similar to those of polytetrafluoroethylene which should furthermore have favourable processing properties and end use properties.

In one embodiment, the present invention lies in a process for the copolymerization of tetrafluoroethylene with 1 to 6 mole %, calculated on the total amount of comonomers added, of a perfluoro(alkyl vinyl) ether of the formula

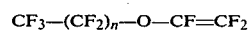

$$CF_3-(CF_2)_n-O-CF=CF_2$$

wherein n is an integer of between 1 and 3, in the presence of radical-forming catalysts and chain-transfer agents at pressures of 3 to 50 atmospheres gauge and temperatures of $+10$ to $+150°$ C., optionally also in the presence of emulsifiers and buffer substances, wherein the copolymerization is carried out with the addition of 25 to 5 mole %, calculated on the total quantity of comonomers added, of hexafluoropropene, in the presence of a liquid chain-transfer agent in aqueous phase.

Perfluoro(propyl vinyl) ether (referred to as PPVE hereinafter) is especially preferred. Mixtures of the mentioned fluoroalkylperfluorovinyl ethers may also be used as comonomers.

The copolymerization is started under free radical-forming conditions. These can be achieved by either a penetrating, high-energy radiation or by water-soluble, radical-forming catalysts, as known in large number by those skilled in the art for the polymerization and copolymerization of tetrafluoroethylene. Catalysts of this type are in particular peroxidic compounds. There may be mentioned here, purely by way of example, hydrogen peroxide, its salts such as sodium or barium peroxide, its addition compounds with borates, carbonates and urea and its diacyl derivatives, such as, for example, diacetyl peroxide, dipropionyl peroxide, dibutyryl peroxide, dibenzoyl peroxide, benzoylacetyl peroxide, disuccinic acid peroxide, diglutaric acid peroxide, and dilauroyl peroxide. Water soluble per-acids, such as peracetic acid, as well as its water-soluble salts (especially ammonium, sodium and potassium salts) or its esters, such as, for example, tert.-butylperoxyacetate and tert.-butylperoxypivalate, may also be mentioned. It is also possible to use the water-soluble salts, especially ammonium, potassium and sodium salts, of other per-acids, such as peroxymonosulfuric aced and peroxydisulfuric aced, and optionally also perphosphoric acid. Also suitable are perfluoroacyl peroxides or ω-hydrofluoroacyl peroxides. A further useful class of catalysts comprises certain water-soluble azo compounds, such as those described, for example, in U.S. Pat. Nos. 2,471,959, 2,515,628 and 2,520,338. Particularly in the lower temperature range it is possible to use as catalyst the known and very effective redox systems, which produce radicals at an adequate rate at temperatures of between 10° to 50° C. Of the redox systems currently used by those skilled in the art for the polymerization of fluoroolefins there may be mentioned here, purely by way of example, the combination of peroxodisulfate and hydrogen sulfite or disulfite, peroxodisulfate and thiosulfate, as well as peroxodisulfate and hydrazine or azodicarboxylic acid (salts, preferably in the form of the alkali metal and especially the ammonium salts) or azodicarbonamide. It is furthermore possible to use with advantage the ammonium alkali metal or alkaline earth metal salts of permanganic or manganic acid or manganous acid.

The quantity of catalyst added is between 0.03 and 2% by weight, preferably between 0.05 and 1% by weight, calculated on the total quantity by weight of the comonomers used. The total quantity of catalyst may be added to the polymerization liquor at the beginning of the reaction. In the case of relatively large batches it may, however, be advantageous to feed in the total quantity of catalyst continuously during the course of polymerization until a conversion of 70 or 80% is reached. It is likewise possible for a portion of the catalyst quantity to be present from the beginning and for the rest to be fed in all at once or in portions. The addition of accelerations for example, soluble salts of iron, of copper and of silver can be advantageous, especially when using redox systems as catalysts.

Whether the copolymerization has to be started and carried out in the acid or alkaline pH range depends on the type of catalyst used. Depending on the type of catalyst used, the pH value of the liquor at the beginning of polymerization should advantageously be in the range of from 3 to 10, preferably in the range of from 4 to 9.

The copolymerization of the three monomers can be carried out either according to the suspension polymerization process or according to the emulsion polymerization process. In the case of suspension polymerization the necessary weakly acidic or weakly alkaline pH range is established by the addition of suitable buffer substances to the aqueous liquor. Examples of buffers for the acidic range, which generally simultaneously act as precipitants, include ammonium chloride, ammonium dihydrogenphosphate, boric acid, and ammonium oxalate, and also mixtures of such compounds. Examples of buffer substances for the alkaline range include, borax, ammonium carbonate, ammonium hydrogen carbonate, ammonium carbamate, ammonium pentaborate or even ammonia itself. It may also be advantageous in the case of suspension polymerization to add a relatively small amount of emulsifiers of the type described hereinafter, in order to avoid the formation of lumps, to prevent coating forming on the vessel and to obtain a relatively uniform particle size. The quantity by weight of such emulsifiers is in this case generally below 150 ppm, preferably below 550 ppm, calculated on the aqueous liquor present at the beginning of the polymerization process.

If the copolymerization is carried out according to the emulsion polymerization process emulsifiers must be added to the liquor in a quantity of approximately 0.01 to 3% by weight preferably 0.03 to 1.5% by weight, calculated on the liquor used. In principle, all emulsifiers familiar to those skilled in the art for the emulsion polymerization of fluoroolefins can also be used for the process according to the invention. Suitable emulsifiers are ammonium and alkali metal salts of relatively long-chained perfluorocarboxylic acids and of ω-hydrofluorocarboxylic acids, particularly those having 6 to 12 carbon atoms. There may be mentioned as examples the salts of perfluorocaproic, perfluorocaprylic, perfluorocapric, and perfluorolauric acid, as well as those of the corresponding ω-hydrofluorocarboxylic acids. It is equally possible to use as emulsifiers the salts of perfluoroalkylsulfonic acids and perfluoroalkylphosphonic acids of the same C-chain lengths. The salts of perfluoroalkoxypropionic acids, especially perfluoropropoxypropionic acid, may be mentioned as an example of a further class of extremely effective emulsifiers. The emulsifiers mentioned may also be used in the form of the free acids and optionally neutralized with ammonia, in which case the ratio of acid and ammonia can also be used to adjust the pH value.

The addition to the polymerization liquor of suitable chain transfer agents having a regulating action is necessary for the production of a terpolymer having a melt viscosity range suitable for processing. In principle all chain transfer agents that under normal conditions are in the liquid state and having an adequate telogenic activity—caused by a weakened C—H—,C—CL— or C—Br— bond—to impart to the terpolymer an "MFI-value" (definition—see below) of 0.1 to 200 g/10 min, are suitable. Suitable chain transfer agents are aliphatic carboxylic acid esters, ketones, alcohols or ether alcohols, such as, for example, acetone, methanol, ethanol, isopropanol, malonic esters or lower dialkylglycol, such as diethyleneglycol or dipropyleneglycol; also halogenated derivatives from these compound groups, such as bromoacetic esters, or bromomalonic esters, bromoacetone, as well as chloromethanol or bromomalonic esters, bromoacetone, as well as chloromethanol or bromomethanol and chloroethanol or bromoethanol. Preferably, in the process of the invention, saturated aliphatic halohydrocarbons that contain as halogens fluorine, chlorine and/or bromine, and optionally also contain hydrogen, are used as liquid chain transfer agents. Especially preferred are those of the formula $C_mX_{2m+2}$ in which $m=1$ to 4, preferably 1 to 3, and X can be F, Cl, Br, H in any combination, provided that the number of F atoms per molecule is a maximum of 2 $m+1$, preferably a maximum of 2, the number of H-atoms is a maximum of $2m+1$ and the number of Br atoms is a maximum of 4. There may be mentioned as examples of such halohydrocarbons, tetrachloroethane, trichloroethane, hexachloropropane, tetrafluorodibromoethane and chlorodibromotrifluoroethane; especially preferred are chloroform, methylene chloride and carbon tetrachloride. Suitable chain transfer agents should be liquid at room temperature (20° C.) and normal pressure, they should be adequately soluble in water and they should bring the swelling rate of the terpolymer to the required range suitable for processing. The quantity of the mentioned liquid chain transfer agents used depends on the intensity of their regulating action, which is known to those skilled in the art, and will be in the range of from 0.02 to 5% by weight calculated on the liquor used. In the case of the preferred halohydrocarbons, 0.05 to 3, preferably 0.1 to 1.5% by weight of liquid chain transfer agent is used, calculated on the liquor. If desired, mixtures of such liquid chain transfer agents can be used. The necessary amount of chain transfer agent is advantageously added before polymerization begins. In the case of quickly reacting chain transfer agents it may, however, be advisable to start with a portion and then feed in the rest continuously or discontinuously during copolymerization.

The copolymerization process according to the invention is advantageously carried out under slightly elevated pressure because of the low solubility of TFE in water; a pressure of 3 to 50 atmospheres gauge is generally sufficient. For reasons concerning safety and costs it is desirable to operate at the lowest possible pressures. As a compromise as regards adequate economy and favourable space-time yields a pressure of approximately 8 to 18 atmospheres gauge has proved most favourable for the copolymerization. The polymerization temperature can, depending on the type of catalyst selected, be in the range of between +10° and +150° C. In order, however, to allow the perfluoro(alkyl vinyl)ethers as little opportunity as possible for undesired side reactions, advantageously temperatures in the lower part of this temperature range are chosen, that is preferably between 10° and 50° C. and especially between 20° and 40° C.

In the case of emulsion polymerization, the addition if necessary of anticoagulants, such as longer chained paraffin hydrocarbons, paraffin waxes or white oils, which should be liquid under the polymerization conditions, can be advantageous, as is also the addition of other dispersion stabilizers in small amounts (<100 ppm), such as polyglycol ethers or polyglycol esters of fatty acids.

The copolymerization according to the invention proceeds for example in the following way. The constituents mentioned as follows are placed in a suitable polymerization vessel, which consists, for example, of steel or some other acid-resistant alloy, and if desired is enamelled on the inside: the reaction medium that is an appropriate amount of demineralized water, in the case of suspension polymerization the desired amount of buffer substance or precipitant, in the case of emulsion polymerization the desired amount of emulsifier and optionally anticoagulant, and also, if necessary, a small amount of accelerator in the form of an aqueous solution of the appropriate metal salt. Then the liquid chain transfer agent and, if using a redox catalyst, one of the two components of the redox pair, are added. Subsequently the three monomers are introduced into the reactor. HFP and the respective PAVE are introduced into the vessel preferably in liquid form, and the TFE is advantageously introduced by way of a gas chamber. All three momoners are preferably introduced separately, but it is possible to introduce mixtures of two or of all three monomers.

In order to achieve the ranges of composition of the terpolymers given in more detail below, the total monomer mixture introduced into the reactor should, gross, have approximately the following composition:
94 to 64 mole % of TFE
5 to 25 mole % of HFP
1 to 6 mole % of PAVE
and preferably
93 to 76 mole % of TFE
6 to 20 mole % of HFP
1 to 4 mole % of PAVE.

If polymerization is to be carried out at high pressures the total quantity of TFE can be introduced at the beginning of the polymerization process. It is more advantageous, however, to introduce 10 to 50% of the required quantity of TFE in the starting mixture of monomers and for feed the remaining quantity into the gas space continuously or in portions in the course of the polymerization process. After establishing the desired pressure by means of the quantity of TFE and after achieving the desired polymerization temperature by cooling or heating, the total quantity of catalyst, or a portion thereof, is added to the liquor by means of a suitable feeder. The addition of the catalyst to the original liquor and its subsequent addition is best carried out in the form of dilute solutions.

The pressure in the polymerization reactor can, if subsequently feeding in a portion of the TFE quantity, be kept constant by controlling the introduction in accordance with the measure of consumption. Under certain circumstances it can also be advantageous subsequently to feed in a portion of one of the two or of both other monomers during the course of the polymerization, either continuously or discontinuously.

The copolymerization is continued until the liquor has a solids content of up to approximately 30% by weight, preferably of 10 to 25% by weight. Thereinafter the supply of the monomer or monomers and optionally the supply of auxiliaries is stopped and the pressure in the vessel can be reduced by subsequently polymerizing down. The monomer mixture that finally remains is slowly blown off and optionally completely removed from the liquor at elevated temperature or reduced pressure, and by means of fractional condensation, or total condensation with subsequent fractional redistillation, separated into the starting components again. Consequently losses of the valuable monomers are almost completely avoided.

The polymerization liquor, which contains the suspended or dispersed terpolymer, is then drawn off and worked up in the usual manner. In the case of the suspension polymer the suspended particles, similar to a fine grit, are separated from the liquor by a sieve or a filter, carefully washed with demineralized water, and depending on the intended use, pulverized or granulated. The product is then dried, tempered and optionally melt-granulated.

The very transparent, bluish-white dispersion resulting from the emulsion polymerization contains the solid in the form of spherical particles having a mean particle diameter of 0.03 to 0.5, preferably 0.1 to 0.3 $\mu$m, and having a narrow size distribution, expressed by the value $\Delta d_{\frac{1}{2}}/d_{av} 0.35$. this value $\Delta d_{\frac{1}{2}}/d_{av}$ is derived from the particle diameter distribution curve. The curve is produced by counting the particle diameters that can be measured in the electron-microscopic scan of the dispersion. In this the abscissa value associated with the curve maximum corresponds to the size $d_{av}$. A straight line is placed through the middle of the corresponding ordinate value parallel to the abscissa axis, and the distance lying between the points of intersection of this straight line with the two branches of the distribution curve is indicated by $\Delta d_{\frac{1}{2}}$. Preferably the value $\Delta d_{\frac{1}{2}}/d_{av}$ for the size distribution is between >0.20 and <0.35.

If a particularly narrow particle size spectrum is desired it can be advantageous to conduct the copolymerization process of the invention according to the emulsion process as a seed polymerization process, that is a certain quantity of a dispersion produced according to the process of the invention is added at the beginning with the liquor to a polymerization mixture, and then the three monomers are polymerized as described. The seed quantity (expressed as solid substance) is advantageously between 1 and 10% by weight, preferably between 2 and 8% by weight, calculated on the quantity of solid in the end dispersion.

The dispersions obtained have an excellent stability and exhibit a favourable settling behaviour. They may subsequently be further stabilized with non-ionic, surface-active dispersing agents, such as, for example, oxalkylated, especially oxethylated alkyl phenols or alternatively polyoxalkylates, and concentrated in this form to higher solid contents for example of 30 to 60% by weight, by known methods. The resulting concentrated dispersions have excellent stability. The terpolymer dispersion obtained according to the process of the invention can be processed as dispersions or coagulated by adding coagulants such as, for example, electrolyte salts or organic solvents, such as acetone, or also by applying shearing forces, for example by stirring, whereby a solid coagulated powder is separated from the liquor and can be worked up in the usual manner.

If the copolymerization is carried out in the manner indicated, the problems with the so-called "unstable end groups" that occur in many cases in the listed state of the art do not arise with the terpolymer obtained. This applies in particular when the polymerization is carried out in the acid pH range using the mentioned manganese compounds as catalysts.

If the polymer is to be further processed in the solid state, it is advantageous first of all to dry it at a high temperature of up to approximately 250° C. and then to temper it for a few hours at approximately 280° C.

The process according to the invention provides a number of considerable advantages. In particular it was completely surprising that as a result of the inclusion of HFP as third comonomer the ratio of incorporation of the PAVE used (that is the quantity of PAVE incorporated in the terpolymer in relation to the concentration of PAVE in the liquor) could be increased quite considerably in comparison with the known copolymerization of TFE with PAVE alone.

The perfluorinated alkylvinyl ethers, such as for example, perfluoro (propyl vinyl), used as comonomers are as is known, produced only by complicated multi-stage processes and are, therefore, extremely costly substances and so the slightest loss of these substances must be avoided as far as possible.

In the copolymerization of TFE with PAVE in organic media, the rate of incorporation of this PAVE, in spite of its complete solubility in the polymerization medium, remains relatively low even when a very large amount of comonomer mixture is metered in. In the processes described in U.S. Pat. Nos. 3,528,954 and 3,642,742, according to the values given therein, with a concentration of the fluorinated ether of 65 to 75 g per liter of liquid organic polymerization medium, only approximately 5 to 9 g is incorporated in 100 g of copolymer. At lower concentrations of the fluorinated ether, i.e. 20 to 32 g per liter of polymerization medium only values of approximately 2.4 to 3.4 g of incorporated ether per 100 g of copolymer are mentioned. Using a purely aqueous polymerization phase, the rate of incorporation drops even lower, presumably as a result of the low solubility of the fluorinated ether in the aqueous liquor. It is evident from the comparison examples 1 and 2 in U.S. Pat. No. 3,635,926 that only 1.9 or 2.2 g of perfluoropropylperfluorovinyl ether respectively could be incorporated in 100 g of copolymer, the concentration ratio being 21.8 g of perfluorinated ether per liter of liquor.

It is therefore completely surprising that these rates of incorporation can be increased by approximately 100 to 200% if HFP is added as a third monomer and participates in the copolymerization. This effect is especially surprising because the rate of incorporation of the PAVE does not increase continuously as the concentration of HFP in the ternary monomer mixture increases, but from a particular HFP content first of all increases markedly, retains this value over a certain range and decreases again at a higher HFP content. This is illustrated in Table I in the example of a number of mixtures with increasing HFP content but with constant addition of TFE and PAVE. The copolymerization mixtures given comprised 3200 g (=32 mole) of TFE, 250 g of perfluoro (propyl vinyl) ether (=0.94 mole; corresponding to a concentration of 11 g/l of liquor) and 50 ml of $CHCl_3$ as chain transfer agent. The pressure was 16 atmospheres, the temperature 30° to 31° C. Otherwise the polymerization conditions corresponded to those in Example 2 (see below).

TABLE I

| Starting mixture | | | | Copolymer | |
|---|---|---|---|---|---|
| | | | | PPVE | HFP |
| HFP (g) | HFP (mole %) | PPVE (mole %) | Melting point (°C.) | (% by weight) | (% by weight) |
| 0 | — | 2.85 | 325 | 1.1 | 0 |
| 200 | 3.88 | 2.74 | 320 | 1.4 | 0.6 |
| 460 | 8.53 | 2.61 | 311 | 2.3 | 1.1 |
| 850 | 14.69 | 2.43 | 309 | 2.7 | 1.5 |
| 1500 | 23.29 | 2.19 | 312–313 | 2.15 | 2.1 |
| 6000 | 54.84 | 1.28 | 311–312 | 0.9 | ~5.5 |

The table shows that without the addition of HFP to the comonomer mixture the rate of incorporation of the perfluoro(propyl vinyl) ether into the copolymer is at the extremely low value of 1.1% by weight, and increases only to an insignificant extent with the addition of small amounts of HFP. In the range of the starting mixture of monomers used in accordance with the copolymerization process of the invention, however, with an HFP proportion of 5 to 30 mole %, an increase of about 100% and more is observed, whereas at high proportions of HFP the rate of incorporation of the perfluoro(propyl vinyl) ether falls back practically to its initial value. On the other hand, the incorporation of HFP into the terpolymer increases continuously in this range.

Both the rate of incorporation of PAVE itself, with and without the HFP addition, as well as the "drag effect" of the HFP for the PAVE into the terpolymer formed, that is the difference in the rate of incorporation produced by the HFP addition, are dependent to a certain extent on the volume of the polymerization reactor or on the volume of the aqueous liquor introduced. When using larger reactors and larger volumes of liquor, the difference of the rate of incorporation of PAVE, determined in copolymers with and without HFP addition, is almost 200% (see Example 1 and Comparison Example 1a).

To summarize, the copolymerization process according to the invention provides the following principal advantages:

(a) As a result of the addition of HFP in quantities as given above, only a half to a third of the quantity of PAVE hitherto necessary in the starting comonomer mixture is required for the incorporation of a particular quantity of PAVE.

(b) Nevertheless, the polymerization rate and the spacetime yield is only slightly reduced by the addition of HFP so that the process according to the invention can be operated economically.

(c) No special gaseous chain transfer agents are required, and consequently the additional problems caused by their use of separating and recovering the monomers are eliminated.

(d) No organic solvents are necessary in the liquor and consequently the complicated separation and recovery of these solvents are eliminated.

(e) A terpolymer with superior properties is produced.

Accordingly, another embodiment of the present invention resides in a non-elastic, thermoplastic terpolymer, which comprises in copolymerized form, wherein the proportions are calculated on the total amount of monomer content and expressed in mole percent (and corresponding weight %), of 95,4 to 99.3 mole % of tetrafluoroethylene (90,9 to 98,75 weight %), 2.1 to 0.3 mole % of hexafluoropropene (3.0 to 0.45 weight %), and 2.4 to 0.3 mole % of a perfluoro(alkyl vinyl) ether (6.1 to 0.8 weight %)

of the general formula $CF_3—(CF_2)_n—O—CF=CF_2$ wherein n is an integer from 1 to 3, and has a melt flowing index (MFI) value of 0.1 to 200 g/10 min, measured at 372° C. under a piston load of 5000 grams according to ASTM D 1238-65-T.

A preferred composition of the terpolymer according to the invention comprises in copolymerized form, expressed in mole % (weight %), of 96.3 to 99.4 mole % (92.55 to 98.75 weight %) of TFE, 1.8 to 0.3 mole % (2.6 to 0.45 weight %) of HFP and 1.9 to 0.3 mole % (4.85 to 0.8 weight %) of a PAVE of the above formula. Especially preferred is a composition of the terpolymer comprising 96.3 to 98.9 mole % (92.55 to 97.55 weight %) of TFE, 1.8 to 0.3 mole % (2.6 to 0.45 weight %) of HFP and 1.9 to 0.8 mole % (4.85 to 2.0 weight %) of a PAVE of the formula given above. The terpolymers may contain mixtures of the PAVE monomers of the formula given above in copolymerized form. Preferred PAVE is the perfluoro(propyl vinyl) ether. Preferably the terpolymers according to the invention have a melt flowing index (MFI) value of 0.5 to 50 g/10 min (using the same measuring conditions).

The terpolymers according to the invention of the above composition and having the given melt index values are obtainable by the above-described copolymerization process of the invention.

The terpolymers, as characterized by the said composition and the MFI values given, have the following characteristic properties:

The density lies in the range of from 2.1 to 2.2, preferably 2.12 to 2.18. It varies slightly, depending on the HFP and PAVE content of the terpolymer concerned.

The melting point is dependent to a greater extent than the density on the composition of the terpolymer and furthermore on the respective adjustment of the MFI value. The melting points of the terpolymers according to the invention (determined as a maximum of the curve of the differential thermoanalysis in the melting range) are in the range between 290° and 320° C., preferably in the range between 300° and 316° C. For example, the terpolymer produced according to Example 1, according to the curve of differential thermoanalysis, has a commencing melting point of 275° C., a melt maximum of 305° C. and the melting range ends at 327° C.

Thermal decomposition of the terpolymers is not discernible before a temperature of 400° C., preferably not before 430° C.

Surprisingly, in spite of the content of HFP, in comparison with the copolymers consisting only of TFE and PPVE the thermal stability is in no way impaired, and is even slightly improved (cf. Table III) even though, as is known, copolymers of TFE and HFP have a substantially lower thermal stability. This is noticeable for example, in the weight loss after heat treatment (measured in test rods according to ASTM D 1708-66). As may be seen from the comparative data, the mechanical properties after such a prolonged heat treatment are improved. The terpolymer also exhibits a more favourable behavior than the bipolymer of TFE and PPVE, in the deformation under load test. At the same load and the same temperature the changes in dimension are approximately 10 to 20% lower than those of the bipolymer (cf. Table VI). In practice this means that parts that are subject to pressure, such as seals, bearings, values, etc. have a higher dimensional stability.

The so-called swelling rate of such thermoplastically processable copolymers is usually defined by the ratio of the diameter of the extruded strand extruded from the melt index testing apparatus and measured after cooling to room temperature at a point 1 cm from the beginning of the strand, to the diameter of the nozzle of this testing apparatus. The said ratio should advantageously be close to 1, which indicates complete correspondence between the dimensions of the molded strand and of the mold. Larger deviations above (swelling) or below (contraction) are extremely undesirable in practice since they impair the production of dimensionally accurate molding articles. Frequently this swelling rate $D_{extrudate}/D_{nozzle}$ (ratio of the diameters) is also quoted in the form of the percentage deviation (swelling rate $-1$) 100. The ideal value here is zero, positive numbers indicate a "percentage swelling", negative numbers a "percentage contraction". In the case of the copolymers of TFE and PAVE produced according to known methods, values of the percentage swelling of up to 30 or up to 20%, still tolerable for practical processing, could only be achieved in the aqueous-phase copolymerization process with the use of gaseous chain transfer agents. The terpolymers according to the invention produce swelling rates that may lie between 0.8 to 1.2, but preferably lie between 0.85 and 1.1, and especially between 0.90 and 1.0. This corresponds to values for percentage contraction and percentage swelling of between $-20\%$ to $+20\%$ at a point 1 cm from the beginning of the strand, but preferably between $-15$ and $+10\%$ and especially between $-10$ and $\pm 0\%$.

In addition, in spite of the content of HFP, the mechanical properties, tensile strength, elongation at break and yield stress) are slightly better at room temperature (Table IV) and at low and high temperatures (Table V) in comparison with the copolymers of TFE and PPVE. The dimensional stability under heat is very noticeably improved (Table VII).

The terpolymers according to the invention also show some improvements when used as insulating materials for electrical wires. Table VIII shows comparative measurements of some electrical properties. It was also found that wire coverings made of the terpolymers according to the invention have an improved elongation at break.

As regards other important properties, the terpolymers according to the invention are absolutely comparable with the known copolymers of TFE and fluorinated alkylvinyl ethers. This applies in particular to the transparency, the ball indentation hardness and the Shore D hardness, the Vicat value, the ultimate bending stress, the severance strength, and also to the resistance to chemical attack. The intrinsic viscosity curve and the flow behaviour are similar.

The results of a number of comparison tests are given below from which the superior properties of the terpolymers according to the invention are evident. The conditions of production, composition, respective melt flowing index value and melting point of the terpolymer samples used for the comparative measurements are compiled in Table II. Samples of a customary commercial copolymer, consisting of units of TFE and of a perflourinated alkylvinyl ether and marketed for a long time by E. I. du Pont de Nemours Co. under the trademark "Teflon ® PFA", are used for the purpose of comparison. Comparative measurements were undertaken with the two customary commercial types 9705 and 9704 (indicated by "O" and "P"). Care was taken that only copolymers with approximately similar characteristics, as reflected in particular by the value of the melt flowing index, were used for comparison.

TABLE IV

| | | Mechanical properties at 23° C. | | |
|---|---|---|---|---|
| | | | Terpolymer | Bipolymer |
| | Unit | C | A | P |
| Tensile strength of molded film | N/mm$^2$ | | 27 | 23.6 |
| Tensile strength of ASTM injection-molded tension test bars | N/mm$^2$ | | 16.2 | 16.0 |
| Tensile strength of injection-molded extended bars | N/mm$^2$ | 17.0 | | 16.2 |

TABLE II

| Prod. | Water 1 | Chain transfer agent (CH$_2$Cl$_2$) % by weight in liquor | Catalyst % MnO$_4$ % by weight in liquor | Pressure atm. gauge | Temp. °C. | TFE moles | Total monomer addition TFE mole % | HFP mole % | PPVE mole % |
|---|---|---|---|---|---|---|---|---|---|
| A | 73 | 1.04 | 0.028 | 12.5 | 30–32 | 136 | 85.2 | 12.5 | 2.3 |
| B | 23 | 0.80 | 0.02 | 16 | 29–31 | 42 | 88.9 | 8.5 | 2.6 |
| C | 23 | 0.80 | 0.02 | 16 | 30–31 | 42 | 88.9 | 8.5 | 2.1 |
| D | 73 | 0.82 | 0.012 | 16 | 29–31 | 162 | 86.9 | 11.1 | 2.0 |
| E | 73 | 1.04 | 0.032 | 12 | 30–31 | 136 | 85.2 | 12.5 | 2.3 |
| O | "Teflon ®" PFA" Type 9705 | | | | | | | | |
| P | "Teflon ®" PFA" Type 9704 | | | | | | | | |

| Prod. | Polymer composition TFE mole % | HFP mole % | PPVE mole % | Polymer composition TFE weight % | HFP weight % | PPVE weight % | Properties MFI g/10 min | Melting point °C. |
|---|---|---|---|---|---|---|---|---|
| A | 97.6 | 0.9 | 1.5 | 94.81 | 1.31 | 3.88 | 17 | 307 |
| B | 98.2 | 0.7 | 1.1 | 96.11 | 1.03 | 2.86 | 18 | 310 |
| C | 97.9 | 0.7 | 1.3 | 95.60 | 1.02 | 3.38 | 14 | 308 |
| D | 98.1 | 0.8 | 1.1 | 95.96 | 1.17 | 2.86 | 2.2 | 312 |
| E | 97.2 | 1.0 | 1.8 | 93.92 | 1.45 | 4.63 | 11.4 | 301 |
| O | | | | | | | 2–3 | 308 |
| P | | | | | | | 15–17 | 308 |

The following were present in all mixtures:
emulsifier 0.10% by weight perfluorooctanoic acid, calculated on starting liquor, neutralised with NH$_3$, pH 3 to 4; also 0.04 to 0.06% by weight ammonium hydrogen oxalate, calculated on starting liquor.

TABLE III

| | | | Mechanical properties after thermal stress | | | | | | |
|---|---|---|---|---|---|---|---|---|---|
| | | | Starting product | | After 100 hrs. at 285° C. | | After 1000 hrs. at 280° C. | | After 2000 hrs. at 280° C. |
| | | Unit | Terpolym. B | Bipolym. P | Terpolym. B | Bipolym. P | Terpolym. A | Bipolym. P | Terpolym. A | Bipolym. P |
| ASTM injection molded tension test bars | tensile strength | N/mm$^2$ | 19.2 | 18.6 | 19.8 | 17.8 | | | | |
| | tensile strength | N/mm$^2$ | | 18.4 | 18.8 | | | 20.3 | 15.4 | 17.9 | 16.5 |
| | yield stress | N/mm$^2$ | 15.0 | 14.2 | 15.6 | 15.6 | | | | |
| | yield stress | N/mm$^2$ | | 14.9 | 14.4 | | | 15.1 | 15.0 | 15.8 | 15.3 |
| | elongation at break | % | 160 | 135 | 280 | 150 | | | | |
| | elongation at break | % | | 140 | 160 | | | 280 | 260 | 265 | 260 |
| tensile strength of a molded film | | N/mm$^2$ | | 21.7 | 22.6 | | | 28.3 | 25.9 | | |
| Yield stress of a molded film | | N/mm$^2$ | | 14.5 | 14.7 | | | 13.6 | 14.0 | | |
| Elongation at break of a molded film | | % | | 415 | 420 | | | 550 | 525 | | |
| Terpolymer/Bipolymer | | | D | O | | | D | O | D | O |
| ASTM injection molded tension test bars | tensile strength | N/mm$^2$ | | 18.7 | 15.9 | | | 21.7 | 18.0 | 22.7 | 18.1 |
| | yield stress | N/mm$^2$ | | 14.5 | 13.9 | | | 15.0 | 15.5 | 15.4 | 16.1 |
| | elongation at break | % | | 190 | 150 | | | 330 | 260 | 295 | 265 |

| Weight loss after the above-given stress times (100 hours at 285° C. and 1000 or 2000 hours at 280° C.) | | | | | | |
|---|---|---|---|---|---|---|
| | Weight loss after 100 hrs. | | Weight loss after 1000 hrs. | | Weight loss after 2000 hrs. | |
| Terpolymer | B | 0.55 | A | 0.83 | A | 1.02 |
| Bipolymer | P | 0.54 | P | 0.87 | P | 1.06 |

TABLE IV-continued

Mechanical properties at 23° C.

| | Unit | Terpolymer C | Terpolymer A | Bipolymer P |
|---|---|---|---|---|
| Yield stress of molded film | N/mm² | | 14.8 | 14.1 |
| Yield stress of ASTM injection-molded tension test bars | N/mm² | | 15.0 | 14.9 |
| Elongation at break of molded film | % | | 480 | 440 |
| Elongation at break of ASTM injection-molded tension test bars | % | | 180 | 200 |
| Elongation at break of injection-molded extended bars | % | 250 | | 150 |

TABLE V

Mechanical properties at different temperatures

| Test temperature °C. | Tensile strength N/mm² Terpolymer A | Tensile strength N/mm² Bipolymer P | Yield stress N/mm² Terpolymer A | Yield stress N/mm² Bipolymer P | Elongation at break % Terpolymer A | Elongation at break % Bipolymer P |
|---|---|---|---|---|---|---|
| −200 | 137 | 135 | 137 | 135 | ~15 | ~15 |
| −50 | 36 | 34.8 | 36 | 34.8 | 60 | 60 |
| −30 | 28 | 27 | 28 | 27 | 95 | 90 |
| 0 | 19.0 | 19.0 | 19.0 | 18.4 | 200 | 200 |
| +10 | 18.8 | 17.8 | 17.6 | 17.2 | 200 | 215 |
| +23 | 15.6 | 15.4 | 15.5 | 15.1 | 230 | 220 |
| +100 | 11.4 | 9.9 | 8.8 | 8.6 | 260 | 255 |
| +150 | 8.6 | 7.6 | 6.0 | 6.2 | 275 | 260 |
| +200 | 6.3 | 6.0 | 5.2 | 5.2 | 295 | 275 |

TABLE VI

Deformation under load after standing for 100 hours

| Product | Load | Temperature | Change In dimension |
|---|---|---|---|
| Terpolymer A | 14 N/mm² | 23° C. | −3.0% |
| Bipolymer P | 14 N/mm² | 23° C. | −3.5% |
| Terpolymer A | 2.5 N/mm² | 150° C. | −3.6% |
| Bipolymer P | 2.5 N/mm² | 150° C. | −4.0% |

TABLE VII

Dimensional stability under heat

| | Limiting temperature °C. | | Limiting temperature °C. |
|---|---|---|---|
| Terpolymer A | 137 | E | 138 |
| Bipolymer P | 94 | P | 95 |

TABLE VIII

Electrical properties

| Property | Unit | Terpolymer A | Bipolymer P |
|---|---|---|---|
| Dielectric strength | sec. | 15 | 5 |
| specific volume resistance | Ω . cm | > 1 . 10¹⁶ | > 1 . 10¹⁶ |
| Specific surface resistance | Ω | 5 . 10¹⁴ | 5 . 10¹⁴ |
| dielectric constant | 5 . 10¹ −10⁶ Hz | 2.04 | 2.04 |
| Arcing resistance | | L 4 | L 4 |
| Dielectric loss factor | | | |
| at 50 Hz | | 0.9 . 10⁻⁴ | 0.9 . 10⁻⁴ |
| 10³ Hz | | < 0.5 . 10⁻⁴ | <0.5 . 10⁻⁴ |
| 10⁴ Hz | | < 0.5 . 10⁻⁴ | < 0.5 . 10⁻⁴ |
| 10⁵ Hz | | 1.1 . 10⁻⁴ | 1.05 . 10⁻⁴ |

The following measuring methods were used to determine the property values quoted in the description, in Tables I to VIII and in the Examples:

(a) The determination of the beginning of the melting range, the middle of the melting range or the maximum melting point and the end of the melting range and establishing the beginning of thermal decomposition is carried out in a differential-thermoanalysis apparatus marketed by Messrs. Linseis (type L 70) with indium as a reference substance in a helium atmosphere at a heating rate of 10° C./min.

(b) The tensile strength, yield stress and elongation at break are determined in known manner according to the ASTM-Standard D-1457-69. The advance speed of the testing apparatus is 50 mm/min. The test bodies required for this are on the one hand stamped out of 2 mm thick molded films which have been produced and are dimensioned according to ASTM Standard D-1708-66. On the other hand injection-molded tension test bars are produced according to ASTM-Standard D-1708-66 and injection molded extended bars according to DIN-Standard 53 455.

(c) A thermostated circulating air oven marketed by Messrs. Haereus is used to measure the long term thermal stability (accuracy ±5° C.). To determine the weight loss 20 to 30 g of each copolymer in in the form of injection molded bars, produced according to ASTM D-1708-66, accommodated in nickel containers, are introduced into the circulating air oven. The weight loss is determined on an automatic precision balance after the respectively given times.

(d) The determination of the density is carried out according to the buoyancy method. The test body, suspended on a perlon thread approximately 10 μm thick, is first of all weighed in air, then the reduction in weight on immersion in butyl acetate is ascertained.

(e) To determine the melt viscosity or the MFI value a testing apparatus according to ASTM-Standard D-1238-65 T is used, in which, however, the melting cylinder, piston and outlet nozzle are made of a corrosion-resistant material. The outlet opening of the 8 mm long nozzle has a diameter of 2.0955 mm. The diameter of the cylinder is 0.95 cm. A certain quantity of polymer is melted in the cylinder at a constant temperature of 372° C. and to compensate for differences in temperature is left for 10 minutes. Then the melt is extruded through the outlet opening of the nozzle with a piston load of 5000 g. The melt flowing index (MFI) value (i₅, 372° C.) is quoted by the quantity of substance in grams emerging within 10 minutes. To obtain the (apparent) melt viscosity the number 531 500 can be divided by the melt index value, the melt viscosity thus being obtained in Poise units.

(f) The dimensional stability under heat is determined according to DIN-Standard 53 461/69. A test body of a certain length, width and thickness is placed on two sharp edges spaced 100 mm from each other and a load of 4.6 kg/cm² is applied in the middle. The temperature in the thermostat is then increased continuously at 2° C./min and the temperature at which bending reaches a fixed limiting mark is determined.

(g) Silvered copper wires of the type AWG 22/7 (AWG=American Wire Gauge) were used for wire-covering. This operation was carried out on a wire extruder with a draw-off speed of 50 m/min. The temperature of the composition was 331° C. in the feed in zone and 382° C. in the extruder head. The thickness of the insulation was 250 μm, corresponding to a total wire thickness of 1.26 mm.

(h) The measurement of the electrical properties was carried out in accordance with the following standards: specific volume resistance according to DIN-standard 53 482; specific surface resistance according to DIN-standard 53-482; dielectric loss factor according to DIN-standard 53 483; dielectric constant according to DIN-standard 53 483; arcing resistance according to VDE specification 0303 part 5/10-75.

(i) The content of PAVE and HFP in the terpolymer according to the invention is determined from the infrared spectra, measured in 25 μm thick molded films on the IR spectrometer Perkin-Elmer 521. The ether content is obtained directly in % by weight if the net absorption of the characteristic band of the PAVE used is related to a reference band at 2353 cm$^{-1}$ and multiplied by a factor in line with the respective molecular weight of the ether. In the case of perfluoro(propyl vinyl) ether, this characteristic band is at 993 cm$^{-1}$ and the multiplication factor is 0.95. The HFP content is determined in an analogous manner. In this case too the net absorption ratio of the characteristic HFP band (983 cm$^{-1}$) and the reference band (2353 cm$^{-1}$) is calculated and multiplied, in this instance by 4.5, which gives the HFP content in % by weight. In the case of a few fluorinated alkylvinyl ethers used in the process of the invention, the characteristic band of the ether lies so close to the HFP band that there is considerable overlapping, and one or other of the two bands appears in the IR spectrum only as a shoulder. In order, in such cases, to arrive at an accurate determination of the content, the spectra of a number of mixtures of bipolymers were taken. For this purpose mixtures of a TFE-HFP copolymer (HFP content 4.7% by weight, determined as 2.28% by weight, determined as described above) were produced in a number of different compositions. As described above, the IR spectra were taken from molded films of these mixtures and evaluated, and from the results calibration curves for the exact evaluation for the terpolymer spectra were obtained.

The terpolymers according to the invention can be mixed in any proportions in the form of powders, granules and dispersions with processing auxiliaries, such as the usual filters, pigments and dyestuffs. There may be mentioned for example inorganic fillers or pigments, such as glass (in the form of powder, beads, flakes or fibers), ceramics, coke, graphite, carbon black, silica and silicates of all kinds, for example, asbestos, mica, talcum, quartz powder, and also metal sulfides and metal oxides, for example, of iron, cobalt, cadmium and chromium, as well as powders of metals and alloys, such as, for example, bronze, copper, aluminium, iron, silver and titanium.

The terpolymers according to the invention are extremely well suited to processing by all conventional methods for the processing of thermoplastic synthetic materials. Examples of such processing methods include the extrusion of strands, profiles, tubes, flat films and blown films, also injection molding processes, calendering films and webs, but also compression molding to form shaped articles of any kind. It is particularly advantageous in a thermoplastic processing method of this type that the terpolymers according to the invention exhibit a very low tendency to the formation of fractures over the entire MFI value range quoted (and over the range of the content of PAVE) and that furthermore, in comparison with copolymers of TFE/PAVE of a comparable melt viscosity, can be processed at temperatures approximately 20° to 40° C. lower. Before shaping by the methods mentioned, the terpolymers according to the invention are advantageously brought into a form suitable for processing (granules, pellets, lentils and the like). There may be mentioned as products and commodity goods that can be produced from the terpolymers of the invention according to the processing methods mentioned, for example, fibers, filaments, films, webs, plates, wire and cable insulation, sliding elements and sealing elements of all kinds, such as piston pin bushings, gaskets and the like, switch segments, pipes and tubes for all purposes, parts of laboratory apparatus, non-conductors for capacitors, woven textile or non-woven fleeces.

In the form of dispersions, especially concentrated dispersions, the terpolymers according to the invention can be used with advantage for coating, impregnating or steeping threads, woven textiles, non-woven fleeces, and also for covering and coating molded bodies and surfaces made of other synthetic materials and other materials such as ceramics, glass and metals. Coating or lamination using the terpolymers according to the invention provides surfaces and articles treated in this manner with protection against corrosive attack by other media, and optionally also imparts increased resistance to temperature. A further use is as an intermediate layer when gluing or welding surfaces or molded bodies of polytetrafluoroethylene or of other fluoropolymers to themselves or to other materials.

The invention is exemplified by the following Examples:

EXAMPLE 1

73 l demineralized water are introduced into a polymerization reactor enamelled on the inside, provided with an impeller stirrer and having a total empty volume of 194 l, and 100 g of perfluorooctanoic acid and 28 ml of ammonia (18% by weight in H$_2$O) as well as 50 g ammonium hydrogen oxalate are dissolved therein. After sealing off the reactor, first of all rinsing is carried out 5 times with nitrogen and then once with tetrafluoroethylene at 1.5 atmospheres gauge. The pressure is then relaxed again, and 430 ml of CH$_2$Cl$_2$ and 975 g (=3.67 mole) of perfluoro(propyl vinyl) ether are pumped in through a pipe. The stirring, previously adjusted to a moderate rate, is then increased up to 175 r.p.m. and 2000 ml (=20 mole) of liquid hexafluoropropene are added to the reactor, the temperature of the liquor being controlled at 25° to 27° C. In the gas phase, 4300 g (=43 mole) of TFE are then introduced into the reactor, the pressure increasing to approximately 12 atmospheres gauge. The stirring speed is then reduced to 140 to 150 r.p.m. and polymerization is started by constantly pumping in a 1.5% by weight aqueous KMnO$_4$ solution at a speed of 30 cm$^3$/min. As soon as the pressure begins to drop additional TFE is added in accordance with the consumption in the gas phase by means of an automatic regulator and the quoted total pressure is maintained. The heat released is removed by cooling the vessel wall, so that the temperature quoted fluctuates only slightly. The supply of TFE and catalyst are maintained until a further 9300 g (=93 mole) of TFE have been introduced into the reactor, which is the case after 65 minutes. In total, therefore, the comonomer mixture introduced has the following composition:

2.30 mole% of PPVE 12.53 mole% of HFP and
85.17 mole% of TFE.

The introduction of catalyst and TFE is then stopped and polymerization is continued until the pressure has dropped to 7 to 8 atmospheres gauge. To recover the remaining monomers, the gas mixture is conveyed through a cooling system for fractional condensation, wherein with simultaneous separation the individual monomers are recovered in high yields.

The quantity of 85.5 kg of terpolymer dispersion obtained, having a solids content of 11.5% by weight, is removed at the base of the reactor. After transferring to a 150 l glass vessel, 150 ml of concentrated HCl are added to the dispersion and stirring is carried out with a high-speed propeller stirrer until the solid material has separated from the aqueous phase. The flaky powder removed by stirring is washed 6 times, while stirring vigorously, with 80 l of demineralized water each time, then separated from the water and dried in the drying chamber under nitrogen at 200° C. for 10 to 12 hours, and finally tempered for a further 8 to 10 hours at 270° to 280° C. In this manner 9.8 kg of a terpolymer are obtained which determined from the IR spectra as described above, has a content of perfluoro(propyl vinyl)ether of 4.5% by weight and a content of HFP of 1.2% by weight and thus has the following molar composition:
97.43 mole % of TFE
0.82 mole % of HFP
1.75 mole % of PPVE.

The melting point maximum determined from the differential thermoanalysis is 305° C. The terpolymer has a melt flowing index value of 16 g/10 min at 5 kg load and 372° C., determined as described above, and a swelling rate, measured 1 cm from the beginning of the strand from the melt flowing index testing apparatus, of 0.82, representing a percentage concentration of 18%.

Of the PPVE present in a concentration of 13 g/l of liquor, 4.5 g were incorporated in each 100 g of polymer, that is a total of 441 g or 44.25% of the monomeric PPVE used. 440 g were recovered, that is, 82.4% of the unreacted monomeric PPVE.

The product exhibited the following properties: density 2.149; tear strength of the ASTM injection molded tension test bar (23° C.) 19.9 N/mm², its yield stress (23° C.) 17.5 N/mm², its elongation at break (23° C.) 160%; tear strength of a molded film 26.4 N/mm², its elongation at break 430%; weight loss after treatment at 280° C. for more than 1000 hours 0.85% by weight, and at 280° C. for more than 2000 hours 0.94% by weight.

COMPARISON EXAMPLE 1a

The copolymerization was carried out in the same manner as that described in Example 1, but without the addition of HFP. The total monomer mixture accordingly had a composition of 2.6 mole % of PPVE and 97.4 mole % of TFE. The copolymer of PPVE and TFE obtained had a PPVE content of 1.7% by weight determined by IR spectroscopy. With the same concentration of 13 g of PPVE per liter of liquor, in this case only 1.7 g of PPVE were incorporated in 100 g of copolymer compared with 4.5 g in Example 1.

EXAMPLE 2

23 l of demineralized water are introduced into a polymerization reactor having an empty volume of 47 l, and 30 g of perfluorooctanoic acid, 8 ml of ammonia (18% by weight in H$_2$O) and 40 g of ammonium hydrogen oxalate are dissolved therein. The reactor is then rinsed with nitrogen and subsequently rinsed with TFE. 180 ml of CCl$_4$ and then 210 g (=0.8 mole) of PPVE and 1000 ml (=10 mole) of liquid HFP are introduced. Increasing the speed of the stirrer, 960 g (=9.6 mole) of TFE are then fed in by way of the gas chamber, as a result of which the pressure increases to 12 atmospheres gauge. The temperature of the liquor is controlled at 27° to 30° C. and the stirring is reduced again to 200 r.p.m. Polymerization is started by pumping in a 1.5% by weight aqueous solution of K$_2$MnO$_4$ and the supply of this initiator solution is maintained at 33 ml/min over the entire duration of polymerization. To compensate for the compensation of TFE, a further 4300 g (43 mole) of TFE are added in the course of 60 minutes. After this time the pressure drop to 7 atmospheres gauge is awaited, then, in order to recover the three monomers, the pressure is relaxed and the monomers, as described in Example 1, are subjected to fractional condensation. The total monomer mixture accordingly has the following composition:
82.97 mole % of TFE
15.77 mole % of HFP and
1.26 mole % of PPVE.

The dispersion formed, in a quantity of 28.5 kg and having a solids content of 15.8% by weight (that is 4.5 kg of terpolymer) is drawn off. 180 g (=4% by weight) of a non-ionic wetting agent, consisting of oxethylated nonylphenol (having 8 to 12 ethylene oxide units) are then added to this dispersion and the dispersion is freed of minerals and ions. The dispersion prepared in this manner is then concentrated in vacuo to a solids content of approximately 50% by weight by the removal of water in a circulation evaporator. The dispersion is stable for a long time in this form.

The terpolymer formed has according to the IR-spectroscopic methods of determination described, the following composition:
97.8 mole% of TFE (95.5 weight %)
1.1 mole% of HFP and (1.6 weight %) and
1.1 mole% of PPVE (2.9 weight %).

A melting point maximum of 310° C. is shown in the differential-thermoanalysis curve, and the melt flowing index value, determined as described above, is 4.7 g/10 min. The swelling rate was measured as 0.94, corresponding to a percentage contraction of only 6%.

The 210 g of perfluoro(propyl vinyl)ether used correspond to a concentration of 9 g/l of liquor. Even at this lower concentration a rate of incorporation of 2.8 g per 100 g of terpolymer was achieved. Of the 84 g of unreacted PPVE, it was possible to recover 65 g, or 77.4%.

The following further properties were determined: injection molded tension test bars: tear strength 16 N/mm², elongation at break 190%, yield stress 16 N/mm², all measured at 23° C., molded films: tear strength 23.6 N/mm², elongation at break 480%. Density: 2.152 g/cm³.

EXAMPLE 3

24 l of demineralized water and 7.5 g of ammonium perfluoropropoxy propionate as emulsifier are introduced into the apparatus described in Example 2. After rinsing the apparatus with nitrogen, 80 ml of CH$_2$Cl$_2$ as well as the three monomers in the following quantities:
1200 g (=12 mole) of TFE
750 g (=5 mole) of HFP and
300 g (=1.13 mole) of PPVE (TFE gaseous, HFP and PPVE liquid) are introduced into the liquor. When the polymerization temperature of 28° to 30° C. is reached a total pressure of 16 atmospheres gauge is established. The polymerization is then started by continuously pumping in a 1.5% by weight aqueous KMnO₄ solution (20 ml/min), and is continued for 50 minutes. During this time a further 2500 g (=25 mole) of TFE are absorbed by the liquor at a pressure which is held constant. The total monomer mixture incorporated accordingly had the following composition:
85.8 mole% of TFE
11.6 mole% of HFP and
2.6 mole% of PPVE.

The pressure in the vessel is then relaxed and the remaining monomers are separated and recycled. The dispersion is worked up according to Example 1, and 2450 g of terpolymer are obtained, which on IR analysis has the following composition:
98.2 mole% of TFE (96.4 weight %)
1.0 mole% of HFP (1.5 weight %)
0.8 mole% of PPVE (2.1 weight %).

The terpolymer has an MFI value of 8 g/10 min and a swelling rate of 0.91, determined as described in Example 1.

EXAMPLE 4

23 l of demineralized water and, dissolved therein, 30 g of perfluorooctanoic acid, 10 ml of ammonia (18% by weight in H₂O) and 20 g of ammonium persulfate, are introduced into the apparatus described in Example 2. After rinsing the apparatus with N₂, a mixture of 130 ml of CH₂Cl₂ and 70 ml of CHCl₃ is added, also 250 g (=0.94 mole) of PPVE is pumped into the liquor and 750 g (=0.5 mole) of HFP and 1200 g (=12 mole) of TFE are pressure fed into the reaction vessel. A pressure of 15 atmospheres gauge is established. After the liquor has been brought to the desired polymerization temperature of 10° to 12° C., the polymerization is started by pumping in a 0.25% by weight aqueous solution of diammonium iron(II) sulfate (Mohr's salt). Over the course of 35 minutes 1990 ml of starter solution are fed in, and a further of 2500 g (=25 mole) of TFE are introduced into the reactor to maintain the polymerization pressure. The total monomer mixture introduced thus comprises the following:
86.2 mole % of TFE
11.6 mole % of HFP and
2.2 mole % of PPVE.

After working up as in Example 1, 2.8 kg of a terpolymer is obtained having the following composition:
98.6 mole % of TFE (97.2 weight %)
0.75 mole % of HFP (1.1 weight %) and
0.65 mole % of PPVE (1.7 weight %).
The melt flowing index value of the terpolymer is 1 g/10 min, the swelling rate 1.02 (determined as described in Example 1). Test bars, stamped out of 2 mm thick molded films, have a tear strength (23° C.) of 23 N/mm² and an elongation at break of 410%.

EXAMPLE 5

24 l of demineralized water are introduced into the apparatus described in Example 2 and 1 g of perfluoropropoxypropionic acid are dissolved therein. After rinsing with N₂, 80 ml of CH₂Cl₂ and 300 g (=1.13 mole) of PPVE are successively introduced by means of a pump as well as 750 g (=5 mole) of liquid HFP by way of a pressure lock. 1200 g (=12 mole) of TFE are then introduced into the vessel by way of the gas chamber. At the polymerization temperature of 29° C. a pressure of 16 atmospheres gauge is established. The polymerization is started by feeding in a 1.5% by weight aqueous solution of KMnO₄, and this solution is metered in further in a quantity of 13 ml/min. A further 2500 g (=25 mole) of TFE are introduced into the vessel by means of the automatic pressure maintaining means during the polymerization time of 76 minutes. Polymerization is then carried out until 7 atmospheres gauge is reached, the pressure in the reactor is relaxed and the gaseous monomers evolved are conveyed to the recovery unit. The liquor with the polymer suspended therein is drawn off by way of the valve in the base of the vessel and the soft, relatively large-particled suspension polymer is separated from the liquor by means of a sieve cup. The product is subsequently washed thoroughly several times with demineralized water, then dried for 12 hours on sheets in an oven at 200° C., and finally thermally treated at 280° C. for a further 8 hours. The yield is 2650 g of terpolymer in the form of a white, particulate, pourable product with the following composition:
98.9 mole % of TFE (97.9 weight %)
0.7 mole % of HFP (1.05 weight %) and
0.4 mole % of PPVE (1.05 weight %)
(determined by IR analysis). The terpolymer has a melt index value of 8.5 g/10 min (determined as in Example 1).

What we claim is:

1. A thermoplastic terpolymer comprising in copolymerized form
   (a) from 99.4 to 95.4 mole percent of tetrafluoroethylene,
   (b) from 2.1 to 0.3 mole percent of hexafluoropropene, and
   (c) from 2.4 to 0.3 mole percent perfluoro(propyl vinyl)ether, said termpolymer having a melt flow index of from 0.1 to 200 grams/10 minutes measured at 327° C. under a piston load of 5000 grams as described in ASTM D 1238-65-T.

2. The terpolymer of claim 1, wherein the melt flow index is from 0.5 to 50 grams/10 minutes.

3. The terpolymer of claim 1 comprising in copolymerized form
   (a) from 99.4 to 96.3 mole percent of tetrafluoroethylene,
   (b) from 1.8 to 0.3 mole percent of hexafluoropropene, and
   (c) from 1.9 to 0.3 mole percent of perfluoro(propyl vinyl)ether.

4. In a process for forming a thermoplastic terpolymer comprising in copolymerized form tetrafluoroethylene, hexafluoropropene, and perfluoro(propyl vinyl)ether in the proportions as claimed in claim 1, said terpolymer having a melt-flow index of from 0.1 to 200 grams/10 minutes measured at 372° C. under a piston load of 5000 grams as described in ASTM D 1238-65-T, by copolymerizing tetrafluoroethylene, hexafluoropropene and perfluoro(propyl vinyl)ether at pressures of from 3 to 50 atmospheres/gauge and temperatures of 10° to 150° C., wherein the improvement comprises performing the copolymerization in an aqueous medium in the presence of a chain transfer agent which is liquid at plus 20° C.

5. The process of claim 4 wherein the liquid chain transfer agent is a liquid member at plus 20° C. of the group of halogenated alkanes of the formula $C_mX_{2m+2}$ wherein M=1 to 4, X=F, Cl, Br or H including combinations thereof, and where the number of fluorine atoms is from zero to 2m+1, the number of hydrogen atoms is from zero to 2m+1, and the number of bromine atoms is from zero to four.

* * * * *